United States Patent [19]

Pidsosny et al.

[11] Patent Number: 4,867,536
[45] Date of Patent: Sep. 19, 1989

[54] COLOR SELECTABLE LIQUID CRYSTAL DISPLAY SYSTEM

[75] Inventors: Richard A. Pidsosny, Canton; Frederick J. Porter, Farmington Hills, both of Mich.

[73] Assignee: Ford Motor Company, Dearborn, Mich.

[21] Appl. No.: 184,568

[22] Filed: Apr. 21, 1988

Related U.S. Application Data

[63] Continuation of Ser. No. 826,437, Feb. 5, 1986, abandoned.

[51] Int. Cl.$^4$ ............................................. G02F 1/133
[52] U.S. Cl. ................................. 350/337; 350/335
[58] Field of Search ............ 350/335, 337, 338, 339 F, 350/334, 341, 388, 408

[56] References Cited

U.S. PATENT DOCUMENTS

| | | | |
|---|---|---|---|
| 2,586,635 | 2/1952 | Fernsler | 350/408 X |
| 3,915,554 | 10/1975 | Maezawa | 350/347 E |
| 4,003,081 | 1/1977 | Hilsum et al. | 358/64 |
| 4,025,164 | 5/1977 | Doriguzzi et al. | 350/337 |
| 4,068,926 | 1/1978 | Nakamura et al. | 350/337 |
| 4,097,128 | 6/1978 | Matsumoto et al. | 350/335 |
| 4,097,130 | 6/1978 | Cole, Jr. | 350/335 |
| 4,116,658 | 9/1978 | Sano | 350/341 X |
| 4,141,627 | 2/1979 | Bloom | 350/349 |
| 4,188,094 | 2/1980 | Fergason | 350/337 |
| 4,211,473 | 7/1980 | Shanks | 350/337 |
| 4,416,514 | 11/1983 | Plummer | 350/335 |
| 4,497,543 | 2/1985 | Aoki et al. | 350/337 |
| 4,562,478 | 12/1985 | Hirasawa et al. | 350/338 |
| 4,593,977 | 6/1986 | Takamatsu et al. | 350/334 F |

FOREIGN PATENT DOCUMENTS

| | | |
|---|---|---|
| 0005417 | 11/1979 | European Pat. Off. |
| 0138456 | 4/1985 | European Pat. Off. |
| 0203569 | 12/1986 | European Pat. Off. |
| 2526496 | 11/1976 | Fed. Rep. of Germany |
| 3340468 | 5/1985 | Fed. Rep. of Germany |
| 0125328 | 6/1987 | Japan |

OTHER PUBLICATIONS

"Producing Colors from a Monochrome Display", Bos, P. J. et al., Technology Report–undated.
"Liquid Crystal Color Switch", Tektronix Preliminary Application Note; Jul. 5, 1983.
Brody et al "A 6×6 Inch 20 Lines-Per-Inch Liquid Crystal Display Panel" IEEE Trans. on Elec. Devices, vol. ED-20, No. 11, Nov. 1973, pp. 995-1001.

Primary Examiner—Stanley D. Miller
Assistant Examiner—Anita E. Pellman
Attorney, Agent, or Firm—Donald J. Harrington; Keith L. Zerschling

[57] ABSTRACT

A system in which several colors of the spectrum are selectable to be displayed having common polarity and with high contrast against a black background, utilizing liquid crystal cells along with linear and color polarizers disposed along an optical axis so that comparable results in either reflective or transmissive modes are achieved, with appropriate light sources.

8 Claims, 2 Drawing Sheets

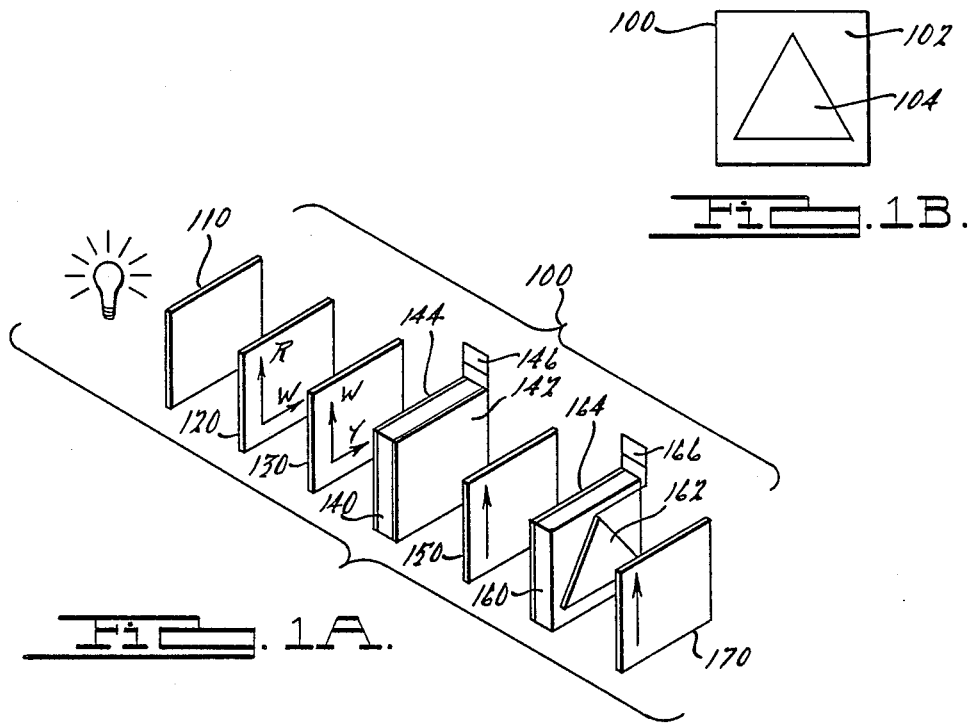
FIG. 1B.
FIG. 1A.
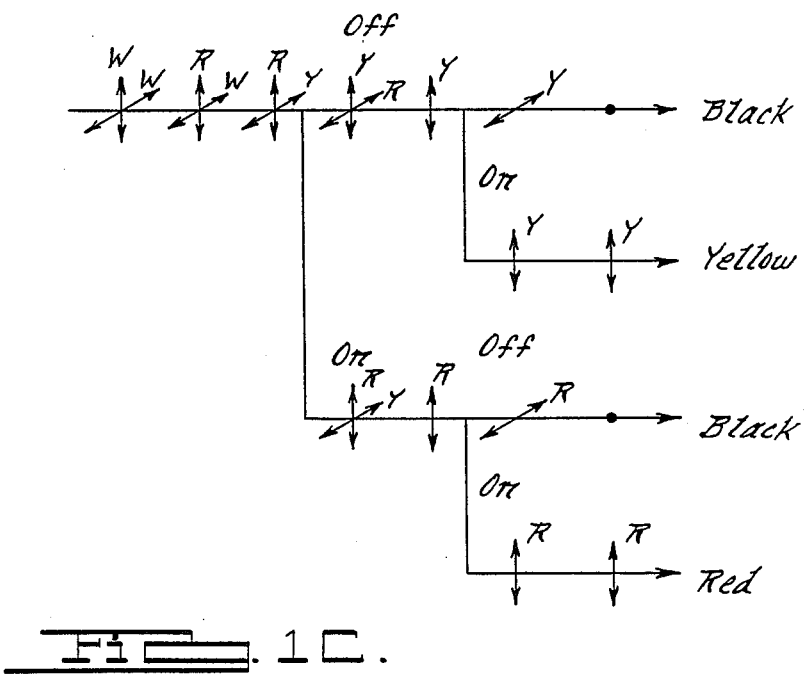
FIG. 1C.

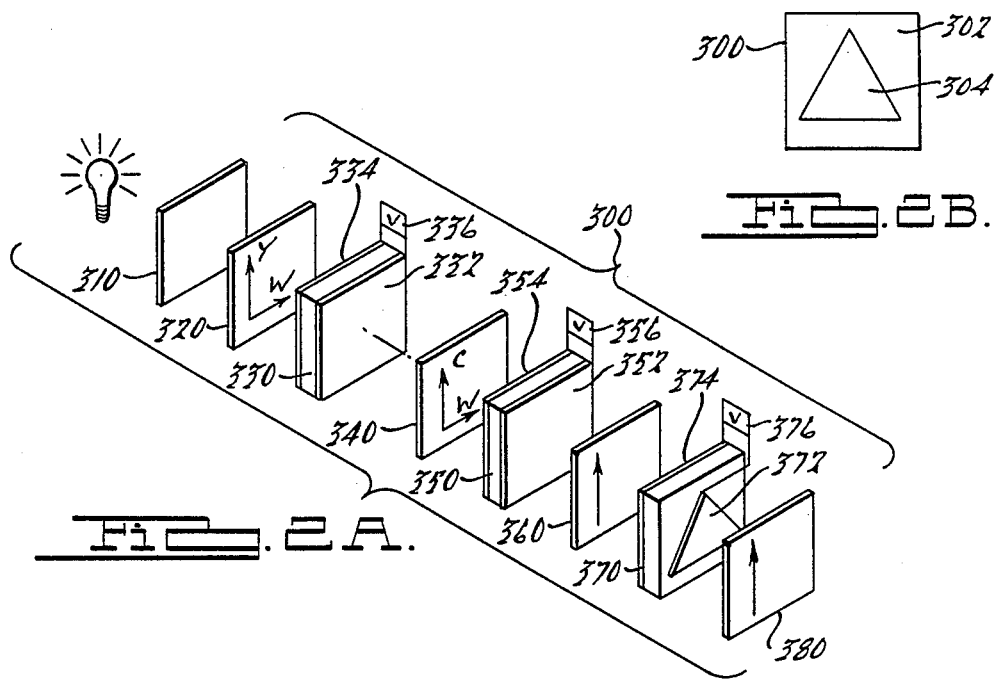
FIG. 2B.
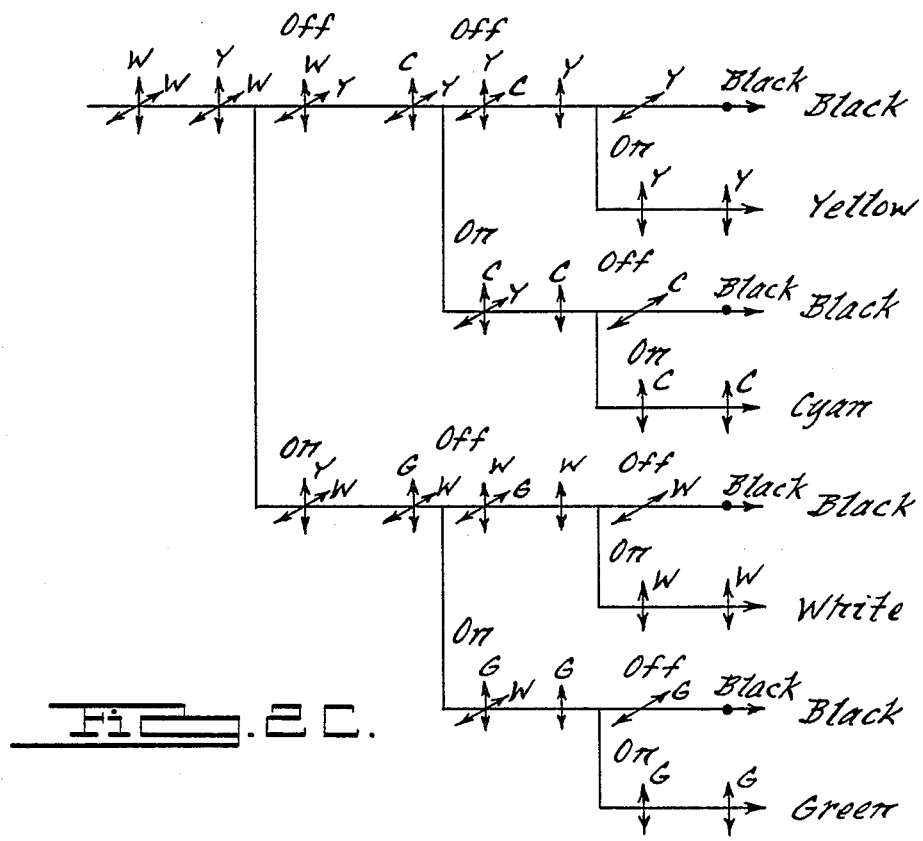
FIG. 2A.
FIG. 2C.

COLOR SELECTABLE LIQUID CRYSTAL DISPLAY SYSTEM

This is a Continuation of application Ser. No. 826,437, filed Feb. 5, 1986.

RELATED APPLICATIONS

The invention is related to commonly assigned, U.S. patent application Ser. No. 826,407 filed Feb. 5, 1986 and entitled "Multicolor Liquid Crystal Display System".

BACKGROUND OF THE INVENTION

1. Field of the Invention

The present invention is directly to the field of liquid crystal displays and more specifically to the area of providing selectable color displays against BLACK backgrounds.

2. Description of the Prior Art

Liquid crystal displays with color selectability have been addressed in several prior art patents. For instance, U.S. Pat. Nos. 4,025,164 and 4,497,543 illustrate the use of a pair of color polarizers having defined planes of color absorption oriented orthogonally to each other and disposed on the viewing side of a liquid crystal cell. In each case, the light displayed is selectable between the two distinct color bands by energizing or deenergizing the liquid crystal cell. However, the light emanating from the display for one color is orthogonally polarized with respect to the other.

In U.S. Pat. No. 4,416,514, a plurality of color polarizers that absorb different portions of the color spectrum and corresponding liquid crystal cells are employed along the optical axis of a display system so that by utilizing various combinations of energized or deenergized cells, different colors may be selected to emanate from the display. However, as in the other prior art devices, color selection does not result in commonality of light polarization.

SUMMARY OF THE INVENTION

It is an object of the present invention to provide an improved liquid crystal display system in which several colors are selectable from the spectrum and those colors are displayed in a common plane of polarization.

It is another object of the present invention to provide an improved contrast in a color selectable display by inhibiting light transmission or reflection from the display in the background or unenergized areas of the segmented or indicia display cell.

It is a further object of the present invention to provide a liquid crystal display system having the aforementioned objects when used in either a transmissive or reflective mode.

Two embodiments of the invention are presented in which each utilizes a plurality of twisted nematic type liquid crystal display cells disposed along a common optical axis. A pair of linear polarizers are disposed on either side of the outer most liquid crystal cell to inhibit the passage of light components in one plane of polarization. A second one of the plurality of liquid crystal cells is disposed adjacent the inner linear polarizer. At least one and preferably two color polarizer elements are disposed adjacent and behind the second liquid crystal cell.

The color polarizers are dichroic films selected for their properties of absorbing components of light in one of the polarization planes (color absorption plane) within a particular portion of the spectrum and transmitting the remainder of the components. Each color polarizer is designated as transmitting a particular color in a particular polarization plane. This color results from the absorption of a portion of the "WHITE" light spectrum along that particular polarization plane. All light components in the orthogonal polarization plane are transmitted, without absorption as WHITE light.

The color polarizers in the first embodiment of the present invention are disposed so as to have their color planes of polarization orthogonally oriented, whereby energization or deenergization of the second liquid crystal cell will align one or the other of the plane polarized colors with the plane of polarization of the second linear polarizer.

In the second embodiment, the color polarizers have their planes of color polarization aligned so that color subtraction may occur when light is passed through both planes of color polarization. However, a third liquid crystal cell is disposed between the elements so that additional selectivity can be made. In the second embodiment, four separate color light displays of common polarity can be selected against a BLACK background.

The present invention is seen as highly desirable for use in outdoor or automotive displays where observers may most likely be expected to wear polarized sunglasses. The plane of display polarization is selected to be parallel to the vertical reference, which is common to the plane of polarization used in most sunglasses. In this manner, each selective color emanating from the displays is transmitted and observable through the properly oriented sunglasses.

One proposed installation of the present invention is in a digital speedometer or tachometer wherein it would be desired to display digits in a restful color such as GREEN or BLUE when the speed value is within an acceptable low range of values, in a warning color such as YELLOW when the speed value is within a cautious range of values and in an alerting color such as RED when the speed value is considered to be above a danger level. Certainly, in such an installation, it is important that each displayed color be in the same plane of polarization so that the displayed image viewed by an operator is not subject to cancellation merely because polarized sunglasses are being worn.

BRIEF DESCRIPTION OF THE DRAWINGS

FIG. 1A is an exploded view of a first embodiment of the present invention.

FIG. 1B is a front view of the first embodiment illustrating energized and deenergized segments thereof.

FIG. 1C is a polarization diagram of light from a back light source for the deenergized segments and background portions of the first embodiment.

FIG. 2A is an exploded view of a second embodiment of the present invention.

FIG. 2B is a front view of the second embodiment illustrating the energized and deenergized segment thereof.

FIG. 2C is a polarization diagram of light from a back light source for the deenergized segments and background portions of the second embodiment.

DETAILED DESCRIPTION OF PREFERRED EMBODIMENTS

An exploded view of a first embodiment of the present invention is shown in FIG. 1A. The composite display 100 is shown utilizing a WHITE back light source behind a diffuser element 110. The forward end of the composite display 100 is viewed through a linear polarizer 170 abutting the front surface of a first liquid crystal display cell 160. The liquid crystal display cell contains a twisted nematic composition and is shown as having a common electrode 164 disposed on one surface of the cell and a segmented electrode 162 disposed on the forward surface of the cell. The electrodes are connected to a suitable AC power source 166 which provides an appropriate energization field to the liquid crystal composition in an area defined by the overlap between the segmented electrode 162 and the common electrode 164. When energized, the area defined by the common overlap of the two electrodes allows light to be transmitted unaffected therethrough. In the unenergized regions of the cell, the liquid crystal medium causes the polarization components of light transmitted therethrough to be rotated by 90 degrees. A second linear polarizer 150 is disposed adjacent to the rear electrode 164 of the liquid crystal cell 160. In this embodiment, the linear polarizer is oriented so that its plane of polarization is parallel to the plane of polarization of the linear polarization 170 located on the front surface. In that manner, light transmitted through the linear polarizer 150 will be rotated by 90 degrees in the unenergized sections of the liquid crystal cell 160 and be cancelled by the cross polarization of the linear polarizer 170. Such an arrangement provides for a BLACK background to unenergized portions of the liquid crystal cell 160 when viewed through the linear polarizer 170. On the other hand, light transmitted through the linear polarizer 150 to the liquid crystal cell 160 will be unaffected by the energized area of the liquid crystal cell 160 and be transmitted through the linear polarizer 170.

A second liquid crystal cell 140 is positioned behind the linear polarizer 150 and contains a pair of opposing electrodes 142 and 144 connected to an appropriate AC power source 146. Color polarizers 120 and 130 are disposed between the diffuser element 110 and the rear surface of the liquid crystal cell 140 so as to provide orthogonally oriented light polarization components of separate colors to the liquid crystal cell 140.

In the embodiment shown in FIG. 1A, the linear polarizers 150 and 170 are shown as having planes of polarization parallel to a reference vertical. Therefore, any light emanating from the display through the linear polarizer 170 will be plane polarized in the vertical plane. With respect to the color polarizers, the color polarizer 120 is shown as being disposed so as to transmit vertical polarization components of the color RED and horizontal polarization components of WHITE light. The color polarizer 130 is shown as being disposed so as to transmit vertical polarization components of WHITE light and horizontal polarization components of the color YELLOW.

In FIGS. 1A and 1, it can be seen that the WHITE light source provides components of polarization through the diffuser 110 in all directions. The light traversing the color polarizer 120 exits as RED light polarized in the vertical direction and WHITE light polarized in the horizontal direction. Subsequently, the passage of those components through the color polarizer 130 results in RED light polarized in the vertical direction and YELLOW light polarized in the horizontal direction. If the liquid crystal cell 140 is left in a deenergized condition, the orthogonal RED and YELLOW planes of polarization are rotated by 90 degrees so that the YELLOW light is vertically polarized and the RED light is horizontally polarized. Therefore, only the YELLOW light will be transmitted through the linear polarizer 150. As indicated above, the deenergized portions of the liquid crystal cell 160 will provide a BLACK background and, in the case of the energized portion of the liquid crystal cell 160 in combination with a deenergized liquid crystal cell 140, YELLOW light will appear in the area corresponding to the energized segment electrode 162. FIG. 1B illustrates the viewable energized colored area 104 against the BLACK background 102.

When the liquid crystal cell 140 is energized, the vertically polarized RED light and the horizontally polarized WHITE light are transmitted therethrough unaffected. However, only the vertically polarized RED light is transmitted through the vertical polarizer 150. The RED light is transmitted through the energized portions of the liquid crystal display cell 160 and the linear polarizer 170 to result in a RED segment 104 displayed against a BLACK background 102.

In FIG. 2A, a second embodiment is shown as composite display 300, which utilizes a pair of color polarizers 320 and 340 disposed on either side of a third liquid crystal cell 330 having opposing electrodes 332 and 336 connected to an appropriate AC power source 336. In the composite display 300, the planes of color absorption and polarization of the two color polarizers are aligned with the vertical, along with the outer linear polarizer 380 and the inner linear polarizer 360. In the case of color polarizer 320, the vertical polarization components of the BLUE portion of the spectrum are absorbed and those of the color YELLOW (GREEN and RED portions of the spectrum) are transmitted to the liquid crystal cell 330. The horizontal components of WHITE light are also transmitted.

When the liquid crystal cell 330 is energized, the vertically polarized YELLOW light is transmitted therethrough and remains vertically polarized. The color polarizer 340 transmits vertical polarization components of the color CYAN (BLUE and GREEN) by its absorption of the RED portion of the spectrum. With the liquid crystal cell 330 energized, the resultant color presented in the vertical plane to liquid crystal cell 350 is GREEN, since the CYAN color polarizer 340 absorbs the RED portion of the YELLOW light. Provided both the liquid crystal cell 350 and a segment of the forward liquid crystal cell 370 are energized, GREEN will be transmitted in the vertical plane through the linear polarizer 380, against a BLACK background.

In the event the liquid crystal cell 330 is energized and the liquid crystal cell 350 is deenergized, the light transmitted in the energized segment area designated as 304 in FIG. 2B will be WHITE, against a BLACK background in the area designated as 302.

With liquid crystal cell 330 in an unenergized condition, the planes of polarization for the YELLOW and WHITE lights are rotated by 90 degrees when transmitted through the cell 330 so that color polarizer 340 transmits CYAN in the vertical plane and YELLOW in the horizontal plane to the liquid crystal cell 350. By energizing or deenergizing liquid crystal cell 350, the system then selects between the YELLOW or CYAN color to be displayed with vertical polarization in the energized segment 304 against a black background.

Although not specifically shown in the Figures, it should be appreciated that the diffusers 110 and 310 could be made partially reflective so that the composite displays 100 and 300 would operate in either the transmissive or reflective modes. In the reflective modes, light would enter through the linear polarizers 170 or 380 and provide the same color results described above. In addition, it should be appreciated that although the embodiments shown in FIGS. 1A and 2A respectively utilize inner linear polarizers 150 and 360 aligned in the vertical plane with the outer linear polarizers 170 and 380, one could orient those inner polarizers orthogonally to the outer polarizers if it is desired to have BLACK indicia displayed against a selected color background.

It will be apparent that many other modifications and variations may be implemented without departing from the scope of the novel concept of this invention. Therefore, it is intended by the appended claims to cover all such modifications and variations which fall within the true spirit and scope of the invention.

We claim:

1. A selectable color display system comprising:
   means providing a source of electrical energy suitable for establishing an energization field in liquid crystal cells;
   a first liquid crystal display cell means containing a twisted nematic liquid composition having defined front and back surfaces for passing light therethrough; a common electrode disposed on one surface thereof and a segmented electrode disposed on the opposite surface for defining an energizable area adjacent to a deenergized area of said cell when said electrodes are selectively connected to said source;
   a first linear polarizer means disposed adjacent said front surface of said first liquid crystal cell means for passing only those components of light polarized in a plane parallel to a first plane of polarization;
   a second linear polarizer means disposed adjacent said back surface of said first liquid crystal cell means for passing only those components of light polarized in a plane parallel to said first plane of polarization;
   a second liquid crystal cell means having defined front and back surfaces with said front surface disposed adjacent said second polarizer means opposing said back surface of said first liquid crystal display cell means and also having electrodes disposed thereon for establishing at least one area that is selectively energizable and deenergizable by said source;
   a first color polarizer means adjacent the defined back surface of said second liquid crystal cell, for passing predetermined components of light of a defined first relatively narrow band of light frequencies to define a predetermined first color polarized in a plane parallel to said first plane of polarization and for passing predetermined components of light of a defined separate second band of light frequencies polarized in a plane of polarization orthogonal to said first plane of polarization, and thereby allowing orthogonally polarized bands of light frequencies to be passed to the defined back surface of said second liquid crystal display cell,
   whereby the energization and deenergization of said first and second liquid crystal cells provides corresponding selection between said first and second bands of light frequencies to be transmitted only through the energized area of said first liquid crystal cell and said first linear polarizer.

2. A system as in claim 1, wherein said deenergized areas of said first liquid crystal cell means appear as black when viewed through said first linear polarizer means against said selectable bands of light frequencies in said energized areas of said first liquid crystal cell means.

3. A system as in claim 1, wherein said color polarizer means includes a pair of dichroic polarizer films each providing light absorption of separate portions of the visible spectrum having polarization components parallel to a predetermined color absorption plane, disposed in tandem with and behind the back surface of said second liquid crystal cell means and having respective planes of color absorption disposed orthogonally to each other, wherein one of said planes of color absorption is parallel to said first plane.

4. A system as in claim 1, wherein said color polarizer means includes a pair of dichroic polarizer films each providing light absorption of a portion of the visible spectrum having polarization components parallel to a predetermined color absorption plane, and a third liquid crystal cell means disposed between said films and having front and back surfaces with electrodes disposed thereon for establishing at least one area that is selectively energizable and deenergizable by said source.

5. A system as in claim 4, wherein said films are disposed so that their respective planes of color absorption are parallel to each other.

6. A system as in claim 5, wherein said planes of color absorption are parallel to said first plane of polarization.

7. A selectable color display system comprising:
   means providing a source of electrical energy suitable for establishing an energization field in liquid crystal cells;
   a first liquid crystal display cell means containing a twisted nematic liquid composition having defined front and back surfaces for passing light therethrough; a common electrode disposed on one surface thereof and a segmented electrode disposed on the opposite surface for defining an energizable area adjacent to a deenergized area of said cell when said electrodes are connected to said source;
   a first linear polarizer means disposed adjacent said front surface of said first liquid crystal cell means for passing only those components of light polarized in a plane parallel to a first plane of polarization;
   a second linear polarizer means disposed adjacent said back surface of said first liquid crystal cell means for passing only those components of light polarized in a plane orthogonal to said first plane of polarization;
   a second liquid crystal cell means having defined front and back surfaces with said front surface disposed adjacent said second polarizer means opposing said back surface of said first liquid crystal display cell means and also having electrodes disposed thereon for establishing at least one area that is selectively energizable and deenergizable by said source;

a first color polarizer means adjacent the defined back surface of said second liquid crystal cell, for passing predetermined components of light of a defined first relatively narrow band of light frequencies to define a predetermined first color polarized in a plane parallel to said first plane of polarization and for passing predetermined components of light of a defined separate second band of light frequencies polarized in a plane of polarization orthogonal to said first plane of polarization, and thereby allowing orthogonally polarized bands of light frequencies to be passed to the defined back surface of said second liquid crystal display cell, whereby the energization and deenergization of said first and second liquid crystal cells provides corresponding selection between said first and second bands of light frequencies to be transmitted only through the deenergized area of said first liquid crystal cell and said first linear polarizer.

8. A system as in claim 7, wherein said energized areas of said first liquid crystal cell means appear as black when viewed through said first linear polarizer means against said selectable colors in said deenergized areas of said first liquid crystal cell means.

* * * * *